United States Patent [19]
Gluntz et al.

[11] Patent Number: 5,375,151
[45] Date of Patent: Dec. 20, 1994

[54] REACTOR WATER CLEANUP SYSTEM

[75] Inventors: Douglas M. Gluntz, San Jose; William E. Taft, Los Gatos, both of Calif.

[73] Assignee: General Electric Company, San Jose, Calif.

[21] Appl. No.: 803,943

[22] Filed: Dec. 9, 1991

[51] Int. Cl.$^5$ .............................................. G21C 19/30
[52] U.S. Cl. ..................... 376/310; 376/313
[58] Field of Search ............... 376/310, 313, 314, 315, 376/370, 371, 298, 299

[56] References Cited

U.S. PATENT DOCUMENTS

| 3,962,078 | 6/1976 | Hirs | 210/27 |
| 4,684,494 | 8/1987 | Dagard | 376/313 |
| 4,699,755 | 10/1987 | Dagard et al. | 376/313 |

FOREIGN PATENT DOCUMENTS

| 1097899 | 7/1989 | Japan . |
| 2059699 | 5/1990 | Japan . |
| 3170095 | 7/1991 | Japan . |

OTHER PUBLICATIONS

JP-A-62058196, Hitachi, Database WPIL, Week 8716, Abstract pg.
JP-A-63180893, Hitachi, Database WPIL, Week 8835, Abstract pg.
D. R. Wilkins et al., "Advanced BWR: Design Improvements Build on Proven Technology," *Nuclear Engineering Internal* reprint Jun. 1986, pp. 1–7 and 6-page drawing.
General Electric Company, "GESSAR II Nuclear Island Design," (22A7007), Two-page cover letter dated Mar. 31, 1980, and pages: title page, 1.1-1, 5.4–45 to 5.4–66, and two-page figures 5.4-12a to -12c, -13c, -15a, -15b, -16a, -17a, and -17b.

*Primary Examiner*—Donald P. Walsh
*Assistant Examiner*—Frederick H. Voss
*Attorney, Agent, or Firm*—J. S. Beulick

[57] ABSTRACT

A reactor water cleanup system includes a reactor pressure vessel containing a reactor core submerged in reactor water. First and second parallel cleanup trains are provided for extracting portions of the reactor water from the pressure vessel, cleaning the extracted water, and returning the cleaned water to the pressure vessel. Each of the cleanup trains includes a heat exchanger for cooling the reactor water, and a cleaner for cleaning the cooled reactor water. A return line is disposed between the cleaner and the pressure vessel for channeling the cleaned water thereto in a first mode of operation. A portion of the cooled water is bypassed around the cleaner during a second mode of operation and returned through the pressure vessel for shutdown cooling.

11 Claims, 1 Drawing Sheet

REACTOR WATER CLEANUP SYSTEM

The U.S. Government has rights in this invention in accordance with Contract No. DE-AC03-90SF18494 awarded by the Department of Energy.

TECHNICAL FIELD

The present invention relates generally to boiling water nuclear reactors, and, more specifically, to a system for cleanup and shutdown cooling of reactor water.

BACKGROUND ART

Conventional boiling water reactors include auxiliary systems including, for example, a reactor water cleanup (RWCU) system, and a residual heat removal (RHR) system which is effective for several functions including shutdown cooling (SDC) of the reactor.

The RWCU system continually cleans the reactor water to remove impurities including fission and corrosion products, and is sized to process the water volume of the reactor system within a cycle that repeats typically every several hours. The system is typically operated during startup, shutdown, and refueling operation, as well as during normal plant operations. The system typically includes in serial flow communication with the reactor pressure vessel a pump for removing reactor water at reactor temperature and pressure (e.g. about 250° C. and about 70 kg/cm$^2$), regenerative and non-regenerative heat exchangers which cool the extracted reactor water, and a cleaner or filter-demineralizer, for removing the impurities. The cleaned flow is returned through the shell side of the regenerative heat exchanger where it is heated before being returned to the pressure vessel. The purified liquid effluent stream leaving the cleaner is also connected to a conventional main condenser and radiation waste tank, the former being used for also obtaining reactor blowdown in which excess reactor water is channeled through the RWCU system to the main condenser, and in the latter waste impurities are periodically purged thereto.

The RHR system typically includes for performing the shutdown cooling function a pump disposed in flow communication with the pressure vessel for pumping a portion of the reactor water to a non-regenerative heat exchanger wherein it is cooled and then returned to the pressure vessel through a conventional feedwater line or directly to the reactor pressure vessel. The RHR system is typically operated only at reactor pressures below about 9 kg/cm$^2$, and is, therefore, designed for accommodating such relatively low pressure. Furthermore, the RHR shutdown cooling system is also sized for channeling reactor water from the pressure vessel at flowrates substantially larger than those used in the RWCU system in order to effectively cool the reactor water upon shutdown.

In each of the RWCU and RHR shutdown cooling systems described above, many of the components thereof are provided in duplicate to ensure redundancy of operation. For example, two each of the non-regenerative and regenerative heat exchangers and the cleaners are typically provided with crosstie pipelines being used for connecting them in parallel flow communication. Furthermore, numerous valves are also used for selectively blocking, switching, and regulating flow in the systems. The redundancy of components not only increases the reliability of the overall systems, it also allows each of the redundant components to be separately maintained while the reactor remains online and operational. In order to maintain or repair one of the redundant components, suitable valves are positioned for allowing operation of one of the components while isolating the redundant component from the flow circuit. The redundant component may then be removed or repaired while the overall system remains in operation.

However, the resulting systems are, therefore, relatively complex and include a substantial number of redundant components and valves. Maintenance requirements are. therefore, relatively high, and, many of the components may only be maintained or serviced upon shutdown of the reactor. For example, although the redundant heat exchangers are disposed in parallel flow with each other, they are typically disposed in serial flow in a single flow branch of the respective systems. Although each of the redundant heat exchangers may be serviced by closing off its respective valves to isolate the heat exchanger, those valves themselves may not be serviced unless the flow thereto is cut off which typically requires reactor shutdown.

OBJECTS OF THE INVENTION

Accordingly, one object of the present invention is to provide a new and improved reactor water cleanup system.

Another object of the present invention is to provide a reactor water cleanup system which is effective for not only cleaning reactor water but also providing shutdown cooling of the reactor.

Another object of the present invention is to provide a reactor water cleanup and shutdown system which eliminates the need for separate shutdown cooling system of the residual heat removal system.

Another object of the present invention is to provide a combined reactor water cleanup and shutdown cooling system having parallel redundant operation for allowing maintenance of components while the system continues to operate without requiring reactor shutdown.

DISCLOSURE OF INVENTION

A reactor water cleanup system includes a reactor pressure vessel containing a reactor core submerged in reactor water. First and second parallel cleanup trains are provided for extracting portions of the reactor water from the pressure vessel, cleaning the extracted water, and returning the cleaned water to the pressure vessel. Each of the cleanup trains includes a heat exchanger for cooling the reactor water, and a cleaner for cleaning the cooled reactor water. A return line is disposed between the cleaner and the pressure vessel for channeling the cleaned water thereto in a first mode of operation. A portion of the cooled water is bypassed around the cleaner during a second mode of operation and returned through the pressure vessel for shutdown cooling.

BRIEF DESCRIPTION OF DRAWINGS

The novel features characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
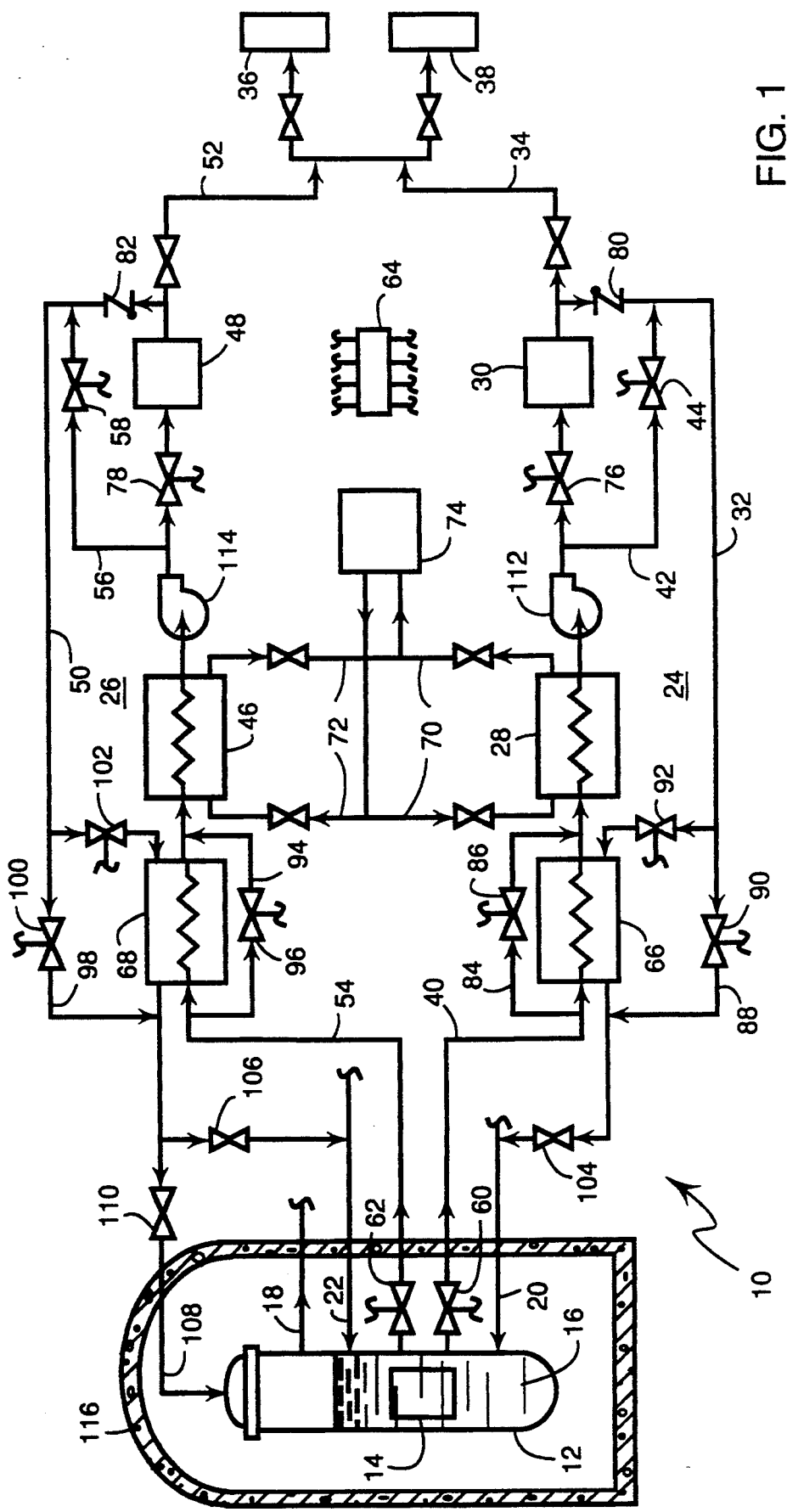
FIG. 1 is a schematic representation of an exemplary boiling water reactor having a reactor water cleanup and shutdown cooling system in accordance with one embodiment of the present invention.

Illustrated schematically in FIG. 1 is a reactor water cleanup (RWCU) system 10 in accordance with one embodiment of the present invention. The system 10 includes a conventional reactor pressure vessel 12 containing a conventional boiling water reactor 14 submerged in reactor water 16. The reactor 14 conventionally heats the water 16 to generate steam which is discharged from the pressure vessel 12 through a conventional steam discharge line 18, which is typically used to power a turbine-generator assembly (not shown) for generating electrical power. A pair of first and second conventional feedwater lines 20 and 22 provide feedwater to the pressure vessel 12 which cools the reactor 14 as well as provides the water source for the generated steam discharged from the discharge line 18.

As used herein, the term "line" means conventional conduits or pipes for channeling water or steam in the system 10.

During normal operation of the reactor 14, the pressure vessel 12 is maintained at a high pressure of about 70 kg/cm$^2$ with the feedwater being provided at a temperature of about 215° C. and the steam being discharged at about 290° C. Accordingly, the reactor water 16 contained in the pressure vessel 12 is at the same elevated pressure, and at a temperature ranging between these two values.

In accordance with the present invention, the system 10 includes first and second reactor water cleanup trains, or loops, 24 and 26, respectively, disposed in parallel flow communication with the pressure vessel 12 for receiving therefrom respective first and second portions of the reactor water 16, which portions are cleaned or cooled and returned to the pressure vessel 12 through the feedwater lines 20 and 22.

More specifically, the first cleanup train 24 includes a first heat exchanger 28, which is preferably a conventional non-regenerative heat exchanger (NRHX) preferably sized as described below for cooling the reactor water first portion. A conventional first cleaner 30 in the form of a conventional filter-demineralizer is disposed in flow communication with the first NRHX 28 for cleaning the reactor water first portion cooled thereby. A first return line 32 is disposed in flow communication with the first cleaner 30 and the first feedwater line 20 for returning the cleaned reactor water from the first cleaner 30 to the pressure vessel 12. A conventional first blowdown line 34 is also disposed in flow communication with the first cleaner 30 and a conventional main condenser 36 and waste collection tank 38. The first blowdown line 34 includes conventional valves and is conventionally operated for periodically purging radioactive reactor water to the collection tank 38 as well as for providing conventional blowdown of the pressure vessel 12 with the excess reactor water being channeled to the main condenser 36.

A first inlet line 40 is disposed in flow communication with the pressure vessel 12, the first NRHX 28, and the first cleaner 30, and means are provided for selectively bypassing a portion of the cooled reactor water from the first inlet line 40 around the first cleaner 30 to the first return line 32. The bypassing means include a conventional first-cleaner bypass line 42 having a normally closed first-cleaner bypass valve 44 disposed in serial flow therein for bypassing cooled reactor water from the first inlet line 40 upstream of the first cleaner 30 to the first return line 32 downstream of the first cleaner 30. The first return line 32 is therefore disposed in flow communication with the outlet ends of both the first cleaner 30 and the first-cleaner bypass line 42 for returning the cleaned reactor water from the first cleaner 30; and, selectively, the cooled only, but not cleaned, reactor water from the first cleaner bypass line 42 to the pressure vessel 12.

The second cleanup train 26 is preferably identical to the first cleanup train 24 in structure and function and correspondingly includes a conventional second non-regenerative heat exchanger (NRHX) 46; a second cleaner 48, also in the form of a conventional filter-demineralizer; a second return line 50; a second blowdown line 52 also conventionally joined to the main condenser 36 and the waste collection tank 38; a second inlet line 54 for channeling the reactor water second portion from the pressure vessel 12 to the second NRHX 46 and in turn to the second cleaner 48; and a second-cleaner bypass line 56 including a normally closed second-cleaner bypass valve 58 for selectively bypassing a portion of the cooled reactor water from the second inlet line 54 around the second cleaner 48 to the second return line 50.

In accordance with the present invention, each of the first and second trains 24 and 26 is selectively operable independently of each other either singularly or together in either a first, or reactor water cleanup (RWCU), mode of operation wherein the first and second cleaner bypassing means are closed and the first and second cleaners 30 and 48 discharge cleaned reactor water into the respective first and second return lines 32 and 50 for flow to the pressure vessel 12; or in a second, or shutdown cooling (SDC), mode of operation wherein the first and second cleaner bypassing means are open for bypassing the cooled reactor water from the respective heat exchangers 28 and 46 around the respective first and second cleaners 30 and 48 to the respective first and second return lines 32 and 50. In this way, each of the first and second trains 24 and 26 may be operated either singularly or together for performing the conventional reactor water cleanup function as well as providing the conventional shutdown cooling function as selectively desired. By bypassing the cooled reactor water around the respective first and second cleaners 30 and 48, a majority of ,the extracted reactor water s channeled through the bypass lines 42, 56 and returned to the pressure vessel 12 as cooled-only reactor water with the remaining portion thereof still being cleaned by the respective first and second cleaners 30 and 48 before being returned to the pressure vessel 12.

The two trains 24 and 26 are preferred for providing redundancy of operation so that each train may be separately maintained during normal operation of the reactor 14 without requiring shutdown thereof, with each train 24 and 26 also providing the two separate conventional functions of reactor water cleanup and shutdown cooling. The resulting cleanup system 10 is, therefore, a simpler and more fully maintainable system as compared to conventional separate RWCU and SDC systems each having redundant components therein.

In order to separately operate the two trains 24 and 26, each of the first and second inlet lines 40 and 54 includes conventional selectively openable and closable first and second control valves 60 and 62, respectively, disposed at inlet ends thereof adjacent to the pressure vessel 12. The first and second control valves 60 and 62, as well as the first and second cleaner bypass valves 44 and 58 are conventionally electrically joined to a conventional electrical controller 64 as indicated schematically by the electrical line portions shown in FIG. 1 which extend from the respective valves to the controller 64.

The first train 24 further includes a conventional first regenerative heat exchanger (RHX) 66 disposed in flow communication in the first inlet line 40 in serial flow between the first control valve 60 and the first NRHX 28. Similarly, a conventional second regenerative heat exchanger (RHX) 68 is disposed in flow communication in the second inlet line 54 in serial flow between the second control valve 62 and the second NRHX 46.

Each of the first and second trains 24 and 26 is conventional in the aspect of using in serial flow communication a regenerative heat exchanger, a non-regenerative heat exchanger, and a cleaner for obtaining the reactor water cleanup function, However, in order to also accommodate the shutdown cooling function into the first and second trains 24 and 26, the different flowrate and cooling requirements for shutdown cooling operation must be accommodated.

More specifically, the first and second RHXs 66 and 68 and the first and second cleaners 30 and 48 are preferably sized for channeling a first flowrate of the extracted reactor water from the pressure vessel 12 for obtaining cleanup of the reactor water in the first mode of operation of the first and second cleanup trains 24 and 26. Each of the trains 24 and 26 is preferably sized for full capacity cleanup operation so that either of the trains 24, 26 may alone provide the cleanup function, which allows each of the trains 24, 26 to be selectively shut down and isolated from the pressure vessel 12 by closing the respective first and second control valves 60, 62 for performing maintenance of the various components thereof. For example, the flow channeling lines through the first and second RHXs 66 and 68 and through the first and second cleaners 30 and 48 may have conventional diameters for channeling sufficient water to perform the reactor water cleanup function, which diameters may be about 7.6 cm for example.

In order to accommodate the conventional higher flowrate and cooling requirements of the shutdown cooling function, the first and second NRHXs 28 and 46 are sized larger than those which would be conventionally used in a reactor water cleanup system for channeling a second flowrate which is greater than the first flowrate and is preselected for obtaining shutdown cooling of the reactor core 12 in the second mode of operation of the first and second trains 24 and 26. The first and second NRHXs 28 and 46 are preferably each sized for full capacity shutdown cooling to channel the larger second flowrate through the respective first and second inlet lines 40 and 54 from the pressure vessel 12. In this exemplary embodiment of the invention, the portions of the inlet lines 40, 54 passing through the first and second NRHXs 28 and 46 have diameters of about 20 cm for accommodating the increased flowrate required. The first and second NRHXs 28 and 46 have correspondingly large, conventional cooling lines 70 and 72, including conventional control valves therein, which are conventionally joined in flow communication with a conventional cooling water supply 74.

Since the first and second cleaners 30 and 48 are sized at the first flowrate, and the first and second NRHXs 28 and 46 are sized at the second, larger flowrate, the respective first and second cleaner bypass lines 42 and 56 are also sized for the second flowrate so that during the shutdown cooling mode of operation, the required cooling flow may flow without obstruction through the bypass lines 42 and 56 and into the return lines 32 and 50 to the pressure vessel 12. The bypass lines 42 and 56 in the exemplary embodiment also have diameters of about 20 cm. Preferably disposed immediately upstream of the first and second cleaners 30 and 48 in the respective inlet lines 40 and 54 and downstream of the inlets of the bypass lines 42 and 56 are first and second conventional control valves 76 and 78, respectively, which are sized at the first flowrate and in this exemplary embodiment also have flow diameters of about 7.6 cm. The control valves 76 and 78 conventionally regulate the flow through the first and second cleaners 30 and 48. Since the cleaning function of the first and second cleaners 30 and 48 is preferred also in the shutdown cooling mode, the first and second cleaners 30 and 48 may remain conventionally sized, with the increased flowrate required for the shutdown cooling mode channeled instead through the respective bypass lines 42 and 56. Conventional first and second check valves 80 and 82 may be provided in the return lines 32 and 50 between the cleaners 30 and 48 and the respective bypass lines 42 and 56 for preventing flow of the bypass reactor water into the blowdown lines 34 and 52 during the shutdown cooling mode of operation.

The return lines 32 and 50 conventionally pass through the first and second RHXs 66 and 68, respectively, so that the reactor water being returned therein may be reheated before being returned to the pressure vessel 12. In order to accommodate the increased flowrate requirement for the shutdown cooling mode of operation, the return lines 32 and 50 are also sized for the second flowrate, and in this exemplary embodiment of the invention also have diameters of about 20 cm. Since the first and second NRHXs 28 and 46 are preferably sized for the shutdown cooling mode of operation, which is also adequate for the reactor water cleanup mode of operation, the first and second RHXs 66 and 68 may be conventionally sized solely for the RWCU function and the correspondingly lower first flowrate for reducing costs. However, in order to accommodate the high second flowrate of the extracted reactor water channeled in the inlet lines 40 and 54 and the return lines 32 and 50 for the shutdown cooling mode, suitable means for bypassing portions of the extracted reactor water around the first and second RHXs 66 and 68 are provided in accordance with the present invention.

More specifically, a forward-bypassing line 84 is disposed in parallel flow communication with the first inlet line 40 around the first RHX 66 for selectively bypassing a majority portion of the reactor water first portion extracted from the pressure vessel 12 around the first RHX 66 directly to the first NRHX 28 during the SDC mode. The forward-bypassing line 84 includes a conventional control valve 86 which is normally closed during the RWCU mode of operation and opened during the SDC mode of operation by the controller 64, and is sized for the second flowrate and has a diameter of about 20 cm in this exemplary embodiment.

Since the first return line 32 conventionally passes through the first RHX 66 for heating the returning reactor water prior to return to the pressure vessel 12, means are also provided for selectively return-bypassing a majority portion of the returning reactor water around the first RHX 66. The return-bypassing means includes a return-bypass line 88, including a conventional control valve 90, disposed in parallel flow with the return line 32 around the first RHX 66. The control valve 90 is selectively positionable by the controller 64 from a normally closed position during the RWCU mode of operation to an open position during the SDC mode of operation. The return-bypass line 88 is sized for the second flowrate and has a diameter of about 20 cm in this exemplary embodiment. A conventional control valve 92 is provided in the parallel portion of the return line 32 to the first RHX 66 for conventionally regulating the return flow therethrough, and in this exemplary embodiment is sized for the first flowrate having an exemplary flow diameter of about 7.6 cm.

Correspondingly, means are also provided for selectively forward-bypassing a majority portion of the extracted water second portion around the second RHX 68 to the first NRHX 46. The means include a forward-bypass line 94, including a selectively positionable control valve 96, sized for the second flowrate with a diameter of about 20 cm. Means are also provided for selectively return-bypassing a majority portion of the returning reactor water around the second RHX 68 and include a return-bypass line 98, and conventional control valve 100, disposed in parallel flow communication with the second return line 50 around the second RHX 68, and are also sized for the second flowrate having diameters of about 20 cm for example. A conventional control valve 102 is provided in the second return line 50 upstream of the second RHX 68 in parallel flow with the control valve 100, and is sized for the first flowrate with a flow diameter of about 7.6 cm for example.

The first and second RHX forward and return bypass valves 86, 90, 96, and 100, respectively, are normally closed in the RWCU mode of operation and open in the SDC mode of operation. When open, a majority of the reactor water extracted from the pressure vessel 12 is allowed to bypass the respective first and second RHXs 66 and 68 for meeting the shutdown cooling function flow requirements through the first and second NRHXs 28 and 46.

Accordingly, in the RWCU mode, the valves 44, 86, and 90 of the first train 24 are normally closed for allowing the reactor water first portion extracted from the pressure vessel 12 to flow through the first train 24 at the first flowrate. Since the first RHX 66 is sized for the first flowrate, it will limit the amount of reactor water channeled through the first train 24 to the first flowrate. The reactor water first portion is channeled through the first inlet line 40 and flows in serial flow communication through the first RHX 66 and the first NRHX 28 for cooling thereof, which cooled flow is then channeled through the first cleaner 30. The cooled and cleaned reactor water first portion is then channeled through the first return line 32 back through the first RHX 66 wherein it is heated and returned to the pressure vessel 12 through the first feedwater line 20. A conventional control valve 104 sized for the second flowrate (20 cm) is provided in the first return line 32 between the first feedwater line 20 and the first RHX 66 for conventionally regulating the flow therethrough.

During the SDC mode, the valves 44, 86, and 90 are opened by the controller 64 to allow the extracted reactor water first portion to flow at the second, increased flowrate through the first train 24 for shutdown cooling operation. A majority of the extracted reactor water bypasses the first RHX 66 through the forward-bypass line 84 to the first NRHX 28 for cooling therein. The minor portion of the reactor water channeled through the first RHX 66 is also cooled thereby before being channeled to the first NRHX 28. A majority of the cooled reactor water discharged from the first NRHX 28 bypasses the first cleaner 30 through the bypass line 42 to the first return line 32. A minor portion of the cooled reactor water is also channeled through the first cleaner 30 although this is not required in the SDC mode. In the first return line 32, a majority of the returning reactor water bypasses the first RHX 66 and flows through the return-bypass line 88 back into the return line 32 for flow to the first feedwater line 20. A minor portion of the returning reactor water may also flow through the control valve 92 and through the first RHX 66, although the control valve 92 may be preferably closed in this SDC mode. The several bypass lines 84, 42, and 88; the first NRHX 28; and the correspondingly large diameter portions of the first inlet line 40 and first return line 32 (e.g. 20 cm diameter), therefore, allow flow therethrough at the second flowrate.

Correspondingly, in the RWCU mode, the valves 58, 96, and 100 of the second train 26 are normally closed for allowing the reactor water first portion extracted from the pressure vessel 12 to flow through the second train 26 at the first flowrate. During the SDC mode, the valves 58, 96, and 100 are opened by the controller 64 to provide the respective bypassing of reactor water for allowing flow through the first NRHX 46 at the second flowrate with the reactor water cooled thereby being returned to the pressure vessel 12 through the second return line 50 bypassing the second RHX 68. In this SDC mode, the valve 102 is also preferably closed.

The second train 26 also includes a conventional control valve 106 in the second return line 50 between the second feedwater line 22 and the second RHX 68 sized for the second flowrate (20 cm) for conventionally controlling flow therethrough.

During the SDC mode, a portion of the returning cooled reactor water may be conventionally channeled also to the top of the pressure vessel 12 through an auxiliary line 108 including a respective valve 110 for selectively providing water to a conventional reactor vessel head spray nozzle (not shown) to condense any steam concentrated in that region as is conventionally accomplished.

Also in the preferred embodiment of the present invention, a conventional first pump 112 may be disposed in flow communication between the first NRHX 28 and the first cleaner 30 for circulating the reactor water first portion through the first cleanup train 24. Similarly, a conventional second pump 114 is similarly disposed in flow communication between the second NRHX 46 and the second cleaner 48 for circulating the reactor water second portion through the second cleanup train 26. By providing the first and second pumps 112 and 114 downstream of the respective first and second NRHXs 28 and 46, the pumps 112, 114 are provided with cooled water which improves the operational lifetimes thereof.

The first and second control valves 60 and 62 are preferably disposed inside a conventional containment vessel 116, with a majority of the first and second cleanup trains 24 and 26 being disposed outside thereof. In this way, upon closing of the respective first and second control valves 60 and 62, each of the first and second trains 24 and 26 may be isolated from the high pressure and temperature reactor water 16 in the pressure vessel 12. Accordingly, all of the components of the first and second trains 24 and 26 disposed downstream from the containment vessel 116 may be replaced or repaired during a maintenance operation without requiring shutdown of the reactor core 14 since one of the trains 24, 26 remains in operation while the other is repaired. Furthermore, any of the valves in the respective trains 24, 26 may be selectively closed for performing maintenance on downstream components therefrom. And, any of the valves may also be used to control flow therethrough. For example, any of the larger valves of each train, i.e., 60, 86, 44, 90, 104, and 62, 96, 58, 100, 106, may be used for controlling the bypass flows through each train.

The two trains 24 and 26 therefore provide redundant operational capability for obtaining both reactor water cleanup operation and shutdown cooling operation as desired. This allows each train to be separately maintained during normal operation of the reactor core 14. Furthermore, by combining shutdown cooling capability with the reactor water cleanup capability, the separate shutdown cooling structures of the conventional residual heat removal system may be eliminated. And, the shutdown cooling function of the first and second trains 24 and 26 may be operated sooner than it otherwise could since it may be operated at the high pressure of the reactor water 16 and need not wait for a reduction of pressure of the reactor water 16 to a relatively low value of about 9 kg/cm$^2$ as is required for a conventional shutdown cooling system.

The two trains 24 and 26 are independent and redundant which allows for separate maintenance thereof during operation of the reactor core 14. Furthermore, conventional crosstie pipelines and corresponding redundant components within a single train are eliminated since redundant trains are instead provided with each having single, non-redundant components therein. The crosstie pipelines and associated valves which are conventionally used to isolate redundant components such as the heat exchangers are no longer required which saves both pipeline and valve costs.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A reactor water cleanup system comprising:
   a reactor pressure vessel containing a reactor core submerged in reactor water;
   a first cleanup train disposed in flow communication with said pressure vessel for receiving therefrom a first portion of said reactor water and including:
   a first heat exchanger for cooling said reactor water first portion;
   a first cleaner for cleaning said reactor water first portion cooled by said first heat exchanger;
   means for selectively bypassing a portion of said cooled reactor water first portion around said first cleaner; and
   a first return line disposed in flow communication with both said first cleaner and said first cleaner bypassing means and with said pressure vessel for returning said reactor water first portion to said pressure vessel;
   a second cleanup train disposed in flow communication with said pressure vessel for receiving therefrom a second portion of said reactor water and including:
   a second heat exchanger for cooling said reactor water second portion;
   a second cleaner for cleaning said reactor water second portion cooled by said second heat exchanger;
   means for selectively bypassing a portion of said cooled reactor water second portion around said second cleaner; and
   a second return line disposed in flow communication with both said second cleaner and said second cleaner bypassing means and with said pressure vessel for returning said reactor water second portion to said pressure vessel;
   and
   each of said first and second cleanup trains being selectively operable singularly of each other or together in either:
   a first mode wherein said operable first and/or second cleaner bypassing means are closed and each of said first and second cleaners discharge cleaned reactor water into said respective first and second return lines at a first flow rate; or
   a second mode wherein said operable first and/or second cleaner bypassing means are open for bypassing said cooled reactor water around said respective first and second cleaners to said respective first and second return lines at a second flow rate sufficient for shutdown cooling of said reactor, greater than said first flow rate.

2. A system according to claim 1 wherein:
   said first cleanup train further comprises a first inlet line disposed in flow communication with said pressure vessel and said first heat exchanger for receiving said reactor water first portion, and including a selectively openable and closable first valve for controlling flow of said reactor water first portion through said first cleanup train; and
   said second cleanup train comprises a second inlet line disposed in flow communication with said pressure vessel and said second heat exchanger for receiving said reactor water second portion, and including a selectively openable and closable second valve for controlling flow of said reactor water second portion through said second cleanup train.

3. A system according to claim 2 wherein said first and second heat exchangers are non-regenerative heat exchangers (NRHXs), and further comprising:
   a first regenerative heat exchanger (RHX) disposed in flow communication in said first inlet line in serial flow between said first valve and said first NRHX, and including means for selectively forward-bypassing a portion of said reactor water first portion around said first RHX to said first NRHX, said first return line passing through said first RHX for heating said returning reactor water first portion prior to return to said pressure vessel, and means for selectively return-bypassing a portion of said returning reactor water first portion around said first RHX;
   a second regenerative heat exchanger (RHX) disposed in flow communication in said second inlet line in serial flow between said second valve and said second NRHX, and including means for selectively forward-bypassing a portion of said reactor water second portion around said second RHX to said second NRHX, said second return line passing through said second RHX for heating said returning reactor water second portion prior to return to said pressure vessel, and means for selectively return-bypassing a portion of said returning reactor water second portion around said second RHX.

4. A system according to claim 3 wherein:

said first and second RHXs and said first and second cleaners are each sized for channeling said reactor water therethrough at said first flowrate;

said first and second NRHXs, said first and second RHX forward and return-bypassing means, said first and second cleaner bypassing means are each sized for channeling said reactor water therethrough at said second flow rate; and said first flow rate being preselected for obtaining cleanup of said reactor water in said vessel by at least one of said first and second cleanup trains in said first mode, and said second flow rate being preselected for obtaining shutdown cooling of said reactor core by said at least one of said first and second cleanup trains in said second mode.

5. A system according to claim 4 further including:

a first pump disposed in flow communication between said first NRHX and said first cleaner for circulating said reactor water first portion through said first cleanup train; and a second pump disposed in flow communication between said second NRHX and said second cleaner for circulating said reactor water second portion through said second cleanup train.

6. A system according to claim 5 further including first and second feedwater lines joined in flow communication with said pressure vessel for channeling feedwater thereto; and wherein said first and second return lines are disposed in flow communication with said first and second feedwater lines, respectively, for returning said reactor water first and second portions to said pressure vessel.

7. A reactor coolant cleanup system for a reactor pressure vessel containing a reactor core submerged in reactor coolant, comprising:

an inlet line for carrying reactor coolant from said reactor pressure vessel at a flow rate equal to at least a predetermined shutdown cooling flow rate;

means for cooling said reactor coolant carried by said inlet line, said cooling means having a flow rate capacity which is equal to at least said predetermined shutdown cooling flow rate;

means for cleaning reactor coolant passed through said cooling means, said cleaning means having a flow rate capacity which is less than said predetermined shutdown cooling rate;

a return line for carrying reactor coolant back to said reactor pressure vessel at a flow rate equal to at least said predetermined shutdown cooling flow rate, said return line being connected to receive cleaned reactor coolant from said cleaning means;

first bypass means for carrying reactor coolant from said cooling means to said return line while bypassing said cleaning means, said first bypass means having a flow rate capacity which is equal to at least said predetermined shutdown cooling flow rate; and means for opening said first bypass means to pass cooled reactor coolant therethrough when said reactor is operated in a shutdown cooling mode and for closing said first bypass means when said reactor is not operated in said shutdown cooling mode.

8. The reactor coolant cleanup system as defined in claim 7, wherein said reactor coolant is water.

9. The reactor coolant cleanup system as defined in claim 7, wherein said cooling means comprises a non-regenerative heat exchanger, further comprising a feedwater line for carrying reactor coolant to said reactor pressure vessel at a flow rate equal to at least said predetermined shutdown cooling flow rate, and a regenerative heat exchanger having a first flow path in series with said inlet line and said non-regenerative heat exchanger, and a second flow path in series with said return line and said feedwater line, said first and second flow paths having a flow rate capacity which is less than said predetermined shutdown cooling rate, and further comprising second bypass means for carrying reactor coolant from said inlet line to said non-regenerative heat exchanger while bypassing said first flow path of said regenerative heat exchanger and third bypass means for carrying reactor coolant from said return line to said feedwater line while bypassing said second flow path of said regenerative heat exchanger.

10. The reactor coolant cleanup system as defined in claim 9, further comprising means for opening said second and third bypass means to pass reactor coolant therethrough when said reactor is operated in a shutdown cooling mode and for closing said second and third bypass means when said reactor is not operated in said shutdown cooling mode.

11. The reactor coolant cleanup system as defined in claim 7, further comprising pump means having an input in flow communication with said heat exchanger and having an output in flow communication with said means for opening and closing said first bypass means and in flow communication with said cleaning means.

* * * * *